April 30, 1935.  L. J. BECKER  1,999,972
MEAT SCORING AND TENDERING DEVICE
Filed Nov. 15, 1933
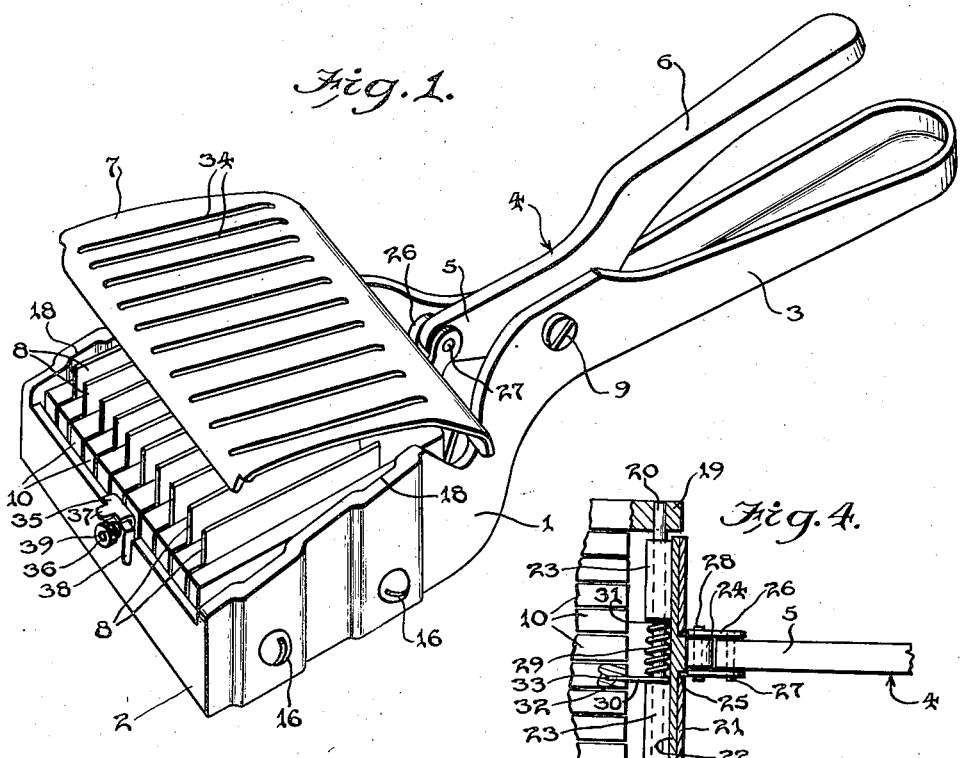
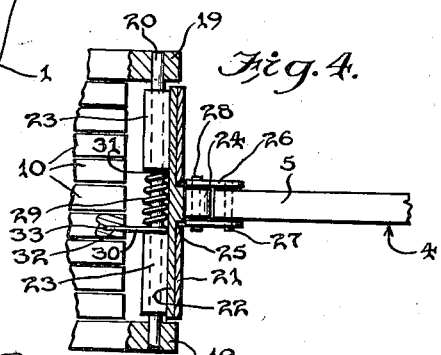
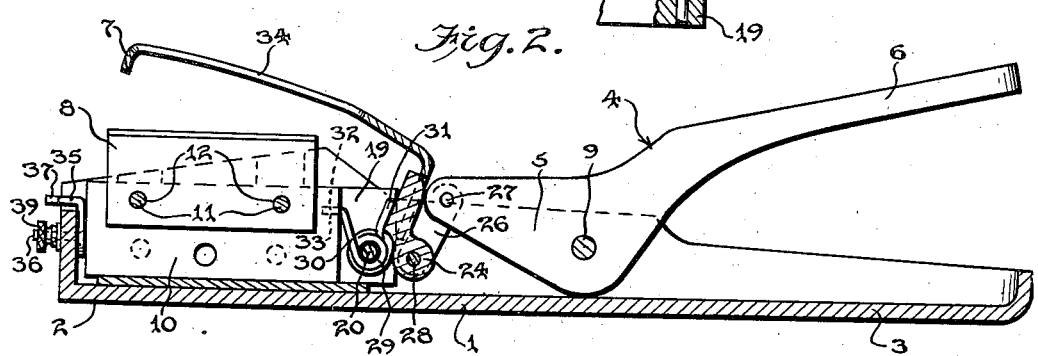
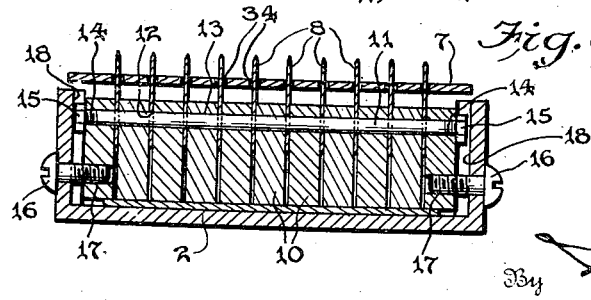
Inventor
Louis J. Becker,
By
Attorney Patented Apr. 30, 1935

1,999,972

UNITED STATES PATENT OFFICE 1,999,972

MEAT SCORING AND TENDERING DEVICE

Louis J. Becker, Rochester, N. Y.

Application November 15, 1933, Serial No. 698,189

20 Claims. (Cl. 17—30)

The invention relates to a meat scoring and tendering device.

The object of the present invention is to improve the construction of meat scoring and tendering devices and to provide a simple, practical and efficient meat scoring device of strong, durable and comparatively inexpensive construction equipped with a plurality of relatively fixed blades adapted to present sharp points to the surface of the meat for readily penetrating the same and capable of cutting and scoring the meat to the required depth with a slicing or shearing cut, whereby the fiber of the meat is severed and separated and the meat rendered tender and easily masticated and digested.

A further object of the invention is to provide simple, practical and efficient means for enabling the depth of the cut of the blades of the device to be readily controlled so that the device may be easily adjusted for cutting the surface of the meat to the desired depth.

Another object of the invention is to provide for the meat scoring and tendering device a combined guard, gauge and blade cleaning member adapted to present a smooth curved surface to the meat during the cutting and scoring operation and operative to clean the blades after such scoring and tendering operation has been completed and forming a guard for the blades to prevent the hands of a person from accidentally coming in contact with the blades and being cut thereby when the device is not in use, whereby the device may be left with perfect safety in a convenient place or position for ready use without danger of injuring the operator or other person.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

Figure 1 is a perspective view of a meat scoring and tendering device constructed in accordance with this invention and illustrating the arrangement of the parts when the device is not in use.

Fig. 2 is a longitudinal sectional view of the same.

Fig. 3 is a transverse sectional view of the meat scoring and tendering device, the hinged member being moved inwardly to cause the blades to project through the same to arrange the device for operation.

Fig. 4 is a detail plan view partly in section, illustrating the construction for hinging the pivoted member to permit the same to swing to and from the positions illustrated in Figs. 1 and 3 of the drawing.

In the accompanying drawing in which is illustrated the preferred embodiment of the invention the meat scoring and tendering device comprises in its construction a frame member 1 consisting of a front substantially rectangular casing 2 and a rearwardly extending handle 3 approximately U-shaped in cross section to form two sides between which is pivoted an operating lever 4. The operating lever consists of a substantially triangular front portion 5 and a rearwardly extending handle portion 6 arranged opposite the handle portion 3 of the frame member so that the handle portions 3 and 6 may be simultaneously grasped to operate a pivoted guard member 7 which is movable to and from a plurality of relatively fixed blades 8 mounted in the casing 2 of the frame member. The lever 4 is pivoted to the handle 3 of the frame member by a transverse screw 9 or other suitable fastening device. The screw 9 which forms the pivot for the lever is located intermediate of the ends of the same to form front and rear arms. The handle 6 constituting the rear arm is clearly illustrated in Fig. 2 of the drawing.

The blades 8 are oblong and are provided with outer longitudinal cutting edges the outer end portions of which cutting edges are exposed when the device is arranged for use, as illustrated in dotted lines in Fig. 2 of the drawing and in full lines in Fig. 3 of the drawing. The blades are reversible so as to enable both end portions of the blades to be used and new blades may be substituted for worn blades as the blades are readily removable for such purpose.

The blades which are relatively fixed may, of course, be of any other preferred form and they extend longitudinally of the device and are arranged in spaced relation and are securely held between longitudinal blade clamping bars 10. The blade clamping bars are connected by transverse fastening devices consisting of screws or rods 11 passing through registering perforations 12 and 13 of the blades and the blade clamping bars and having threaded terminals 14 for the reception of nuts 15 which enable the blades to be firmly clamped by the bars 10.

The casing 2 of the frame member consists of a bottom side and end walls and is open at the top when the device is arranged as illustrated in Figs. 1 and 2 of the drawing. The side walls are preferably tapered longitudinally and the blade holder formed by the bars 10 and the rods 11 and the group of blades are arranged in the casing with the blades projecting beyond the casing. The blade holder is secured in the casing by screws 16 which pierce the side walls of the casing and the adjacent blade clamping bars, as clearly illustrated in Fig. 3 of the drawing. The inner ends of the screws are threaded into the openings 17 of the adjacent blade clamping bars and in order to enable the holder to fit snugly within the substantially rectangular casing of the frame member 1 the side walls of the frame member are provided at their inner faces with recesses 18 preferably formed by offsetting portions of the side walls of the casing, as clearly illustrated in Fig. 3 of the drawing. The recesses 18 are arranged to receive the nuts 15 and the terminal portions of the fastening devices 11. This provides a compact structure.

Two of the blade clamping bars of the blade holder are provided with rearward extensions 19 located at opposite sides of the device and forming supports for a transverse pivot or pintle 20 to which the guard member 7 is hinged or pivoted. The pintle 20 pierces the spaced extensions 19 and the pivoted member 7 is provided at its inner or rear edge with a transverse flange 21 to which is secured a plate 22 provided with spaced eyes 23 through which passes the pintle 20 whereby the pivoted member 7 is hinged to the blade holder, as clearly illustrated in Fig. 4 of the drawing. The plate 22 constitutes a hinge leaf and the eyes 23 are located at the ends of the plate. The rearward extensions form hinge eyes and the said eyes and the pintle constitute a hinge connection between the pivoted member 7 and the blade holder.

The plate 22 is also provided with a centrally arranged rearwardly extending lug 24 extending through a slot 25 in the flange 21 and connected by links 26 to the front arm of the operating lever 4. Suitable pivots 27 and 28 connect the links 26 to the lever and to the lug 24. A coiled spring 29 is mounted on the pintle 20 centrally thereof and the terminals 30 and 31 of the coil of the spring are extended and bear against the plate 22 and the blade holder for holding the pivoted member 7 normally spaced from the blades to form a guard. The end 32 of the terminal portion 30 of the coiled spring is fitted in a socket 33 in one of the blade clamping bars and is retained in engagement with the socket by the resiliency of the spring whereby the spring is prevented from sliding along the pintle.

In the operation of the device the handles 3 and 6 are grasped by the operator and are compressed by the hand and moved towards each other, the inward movement of the handle 6 with respect to the handle 3 operating through the links 26 to move the pivoted member 7 inwardly towards the blades 8. The pivoted member is provided with spaced slots 34 through which the cutting edges of the blades project when the pivoted member is moved to the limit of its inward movement. The front corner portions of the blades are exposed and are effective for scoring and tendering the meat and the pivoted member which is curved slightly in a direction longitudinally of the device presents a smooth slightly curved surface to the meat and the blades will cut the surface of the meat and score the same to the desired depth severing the fiber and rendering the meat tender and easily masticated and digested. As soon as the handle 6 of the lever is released or relieved of pressure the spring 29 will automatically lift or move the pivoted member and carry the same to a position beyond the cutting edges of the blades and it normally covers the blades and forms an effective guard for preventing a person from coming in contact with the blades. Also the outward movement of the pivoted member 7 automatically cleans the blades and removes from the blades any meat adhering to the same after the scoring and tendering operation has been completed.

As the front end portions of the blades are exposed and are the effective portions of the blades in the scoring and tendering operation the effective portion of the blades may be readily renewed by simply reversing the blades when the front end portions of the same become dull or worn. The blades are readily removable and may be either sharpened or replaced by new blades when worn or dull.

The inward movement of the pivoted member 7 is limited to vary the amount of the projecting portions of the blades to adjust the device to score or cut to the desired depth by means of an adjustable stop 35 consisting of an approximately L-shaped plate pivoted by a screw 36 or other suitable fastening device to the inner face of the front wall of the casing 2 and extending upwardly beyond the upper edge of the front wall, when the device is in the position illustrated in Figs. 1 and 2 of the drawing, to form a stop for the pivoted member 7. The L-shaped plate extends forwardly to form a finger piece 37, by means of which the pivoted stop may be readily adjusted and in order to increase the range of adjustment of the stop the front wall is provided with a substantially arcuate slot 38 to receive the forwardly projecting portion of the plate and permit the stop to be swung downwardly to a position in flush relation with the upper edge of the front wall of the casing to provide a maximum amount of projection of the blades. The stop 35 is secured in its adjustment by means of a knurled nut 39 arranged on the outer threaded portion of the screw 36 and adapted to be screwed tightly against the front wall of the casing to secure the stop in any position within its range of movement.

What is claimed is:—

1. A meat scoring and tendering device comprising a frame member, a plurality of blades mounted on the frame member and having cutting portions projecting therefrom, a guard member hinged to the frame member and movable toward and from the blades and arranged to normally swing outwardly and extend over the cutting portions of the blades away from the cutting edges of the blades to form a guard for the same and having openings through which the blades are adapted to project, and an operating lever mounted on the frame member and connected with the hinged member for swinging the same from its normal outward position inwardly toward the frame member to a position over the latter inwardly of the cutting edges of the blades.

2. A meat scoring and tendering device comprising a frame member, a plurality of spaced parallel relatively fixed blades rigid with the frame member and having cutting portions projecting beyond the frame member, a hinged guard member carried by the frame member and normally extending over and away from the cutting portions of the blades to form a guard for the same and provided with openings through which the blades project when the guard member is moved inwardly with relation to the frame member, an operating lever mounted on the frame member and connected with the guard member for moving the same inwardly toward the frame member to a position between the latter and the cutting edges of the blades, and spring means for automatically moving the guard member outwardly when the operating lever is released.

3. A meat scoring and tendering device comprising a frame member consisting substantially of a front casing and a rearwardly extending handle portion, said casing being open at one of its faces, a plurality of fixed blades mounted within the casing and having cutting portions projecting at the open face of the casing, a hinged guard carried by the frame member and normally swung over and away from the blades to a forward inclined position with relation to the cutting edges of the blades to form a guard for the same and provided with slots through which the blades are adapted to project, and an operating lever mounted on the frame member and connected with the guard member to swing the same inwardly toward the frame member into substantially parallel relation therewith and positioned between the frame member and the cutting edges of the blades to cause the blades to project through the slots of the guard member.

4. A combined meat scoring and tendering device comprising a frame member consisting of a substantially rectangular casing open at one of its faces, a blade holder mounted within the casing, a plurality of fixed blades secured within the blade holder and having cutting portions projecting beyond the casing, a substantially rectangular guard member carried by the casing, means for hinging the guard member to permit the same to swing inwardly and outwardly to and from the blades, said guard member being normally spaced from and extending over the blades to form a guard for the same, and operating means connected with the guard member for moving the same inwardly to a position between the frame member and the cutting edges of the blades and substantially parallel with the frame member and the cutting edges of the blades.

5. A combined meat scoring and tendering device comprising a frame member consisting of a substantially rectangular casing open at one of its faces, a blade holder mounted within the casing, a plurality of fixed blades secured within the blade holder and having cutting portions projecting beyond the casing, a substantially rectangular guard member carried by the casing, means for hinging the guard member to permit the same to swing inwardly and outwardly to and from the blades, said guard member being normally spaced from and extending over the blades to form a guard for the same, spring means for automatically moving the guard member outwardly, and an operating lever mounted on the frame member and connected with the guard member for swinging the same inwardly toward the frame member substantialy into parallelism therewith and between the same and the cutting edges of the blades.

6. A meat scoring and tendering device comprising a frame member, a blade holder mounted on the frame member and composed of a plurality of parallel blade clamping bars and fastening means connecting the bars, fixed blades clamped between the said bars of the blade holder and spaced apart by the same and having projecting cutting portions, a hinged guard carried by the frame member and normally extending over the cutting portions of the blades and forming a guard for the same, said guard member being provided with openings through which the blades are adapted to project when the guard member is moved inwardly, and operating means for moving the guard inwardly to a position between the frame member and the cutting edges of the blades.

7. A meat scoring and tendering device comprising a frame member, a blade holder mounted on the frame member and composed of a plurality of parallel blade clamping bars and fastening means connecting the bars, a pair of the blade clamping bars being provided with rear extensions, fixed blades clamped between the said bars and spaced apart by the same and having cutting portions projecting beyond the frame member, a pintle carried by said rear extensions, a guard member hinged to the blade holder by the said pintle and normally extending over the cutting portions of the blades to form a guard for the same, said guard member being provided with openings through which the blades project when the guard member is moved inwardly, and operating mechanism for moving the guard member inwardly.

8. A meat scoring and tendering device comprising a frame member, a blade holder mounted on the frame member and composed of a plurality of parallel blade clamping bars and fastening means connecting the bars, a pair of blade clamping bars being provided with rear extensions, fixed blades clamped between the said bars and spaced apart by the same and having cutting portions projecting beyond the frame member, a pintle carried by said rear extensions, a guard member hinged to the blade holder by the said pintle and normally extending over the cutting portions of the blades to form a guard for the same, said guard member being provided with openings through which the blades project when the guard member is moved inwardly, a coiled spring disposed on the pintle and bearing against the guard member for urging the same outwardly, an operating lever mounted on the frame member, and means for connecting the operating lever with the guard member whereby the operating lever is adapted to move the guard member inwardly against the action of the spring.

9. A meat scoring and tendering device comprising a frame member, a blade holder mounted on the frame member and composed of a plurality of blade clamping bars and fastening means connecting the same, a pair of the blade clamping bars being provided with rear extensions, blades clamped between the said bars and spaced apart by the same, a pintle carried by the rear extensions, a guard member normally extending over and forming a guard for the cutting portions of the blades and provided with eyes mounted on the said pintle, said guard member being also provided with a rearwardly extending lug, a lever mounted on the frame member and a link connection between the operating lever and the said lug whereby the lever is adapted to move the guard member inwardly.

10. A meat scoring and tendering device comprising a frame member provided with a plurality of fixed blades having projecting cutting portions, a hinged guard member normally extending over the blades and forming a guard for the same, said guard member having openings through which the blades project when the guard member is moved inwardly, operating means for swinging the guard member inwardly to a position between the frame member and the cutting edges of the blades to expose the cutting edges beyond the guard through the slots of the latter, and an adjustable stop carried by the frame member and arranged in the path of the guard member to cause the blade to project to a greater or less degree when the guard member is moved inwardly.

11. A meat scoring and tendering device comprising a frame member provided with a plurality of fixed blades having projecting cutting portions, a hinged guard member normally extending over the blades and forming a guard for the same, said guard member having openings through which the blades project when the guard member is moved inwardly, operating means for moving the guard member inwardly, and a pivoted stop mounted on the frame member and arranged in the path of the guard member and movable to different positions to adjust the device for causing the cutting portions of the blades to project to a greater or less extent beyond the guard member when the latter is at the limit of its inward movement, and means for securing the pivoted stop in its adjustment.

12. A meat scoring and tendering device comprising a frame member provided with a plurality of fixed blades having projecting cutting portions, a hinged guard member normally extending over the blades and forming a guard for the same, said guard member having openings through which the blades project when the guard member is moved inwardly, operating means for moving the guard member inwardly, and a pivoted stop mounted on the frame member and arranged in the path of the guard member and movable to different positions to adjust the device for permitting the cutting portions of the blades to project to a greater or less extent beyond the guard member when the latter is at the limit of its inward movement, the pivot of the stop being provided with a threaded projecting portion and a clamping nut mounted on the threaded projecting portion of the said pivot for securing the stop in its adjustment.

13. A meat scoring and tendering device including a frame member provided with an open casing, a blade holder mounted in the open casing and having fixed blades projecting beyond the casing, a hinged guard member carried by the frame member and normally extending over the cutting portions of the blades to form a guard for the same, said guard member having openings through which the blades project when the guard member is at the limit of its inward movement, an adjustable stop arranged at the inner face of one of the walls of the casing and projecting beyond the casing and having a pivot extending through the said wall and provided with an exteriorly threaded portion, said stop being located in the path of the guard member and having an outwardly projecting finger portion, and a clamping nut mounted on the threaded portion of the pivot for engaging the said wall to secure the stop in its adjustment, said wall having a slot arranged to receive the projecting portion of the stop when the latter is swung downwardly.

14. A meat scoring and tendering device comprising a blade holding member including a handle, spaced blades fixedly carried by said member, a guard swingingly mounted on the said member between the member and said handle and normally extending upon a forward incline over and away from the cutting edges of the blades and having spaced openings through which the blades project when the guard is swung inwardly, a second handle pivoted on the aforesaid handle and having connection with said guard to swing the latter inwardly toward the frame member between the latter and the cutting edges of the blades when said handles are moved toward each other.

15. A meat scoring and tendering device comprising a blade holding means, spaced blades fixedly mounted on said member, a guard swingingly mounted on said member, means to normally maintain the guard in a position over and away from the blades, the guard having openings through which the cutting edges of the blades project when the guard is swung inwardly, and means operatively connected to the guard to swing the latter inwardly toward said blade holding means between the latter and the cutting edges of the blades.

16. A meat scoring and tendering device comprising means for the support of blades, a plurality of spaced parallel fixed blades on said means and having cutting portions projecting therefrom, a hinged guard carried by said means and normally extending over and away from the cutting edges of the blades to form a guard for the same and provided with openings through which the blades project when the guard is moved inwardly with relation to said means and the blades, spring means for automatically moving the guard member normally outwardly, and a pivoted operating lever mounted on the aforesaid blade supporting means in the rear of said blades and in the rear of said guard and having operative connection with the guard to move the same inwardly against the action of said spring means toward the blade supporting means to permit passage of the cutting edges of the blades through the openings in the guard.

17. A meat scoring and tendering device comprising means for the support of blades, a plurality of spaced parallel fixed blades on said means and having cutting portions projecting therefrom, a hinged guard carried by said means and normally extending over and away from the cutting edges of the blades to form a guard for the same and provided with openings through which the blades project when the guard is moved inwardly with relation to said means and the blades, spring means for automatically moving the guard member normally outwardly, and a pivoted operating lever mounted on the aforesaid blade supporting means in the rear of said blades and in the rear of said guard, a link having pivotal connection with the inner end of the operating lever and having pivotal connection with said guard whereby movement of the operating lever in one direction against the action of said spring means moves said guard toward said supporting means to permit passage of the cutting edges of the blades through the openings in the guard.

18. A meat scoring and tendering device comprising a member, a plurality of spaced parallel substantially rectangular blades mounted on the member and rigid therewith and provided with cutting portions projecting beyond the member at one of the faces thereof, a hinged guard carried by the member and normally extending outwardly over the cutting portions of the said blades to form a guard for the same and provided with slots through which the blades project when the guard is moved inwardly with respect to the said member, means for automatically moving the guard member outwardly, and operating means pivotally connected with the guard in the rear of the same for moving the same inwardly forwardly of the operating means to cause the blades to project through the openings of the guard member.

19. A meat scoring and tendering device comprising a frame member, a plurality of relatively fixed blades carried by the frame member and having projecting portions extending beyond the frame member for scoring and tendering meat, a hinged guard member normally extending over and away from the cutting portions of the blades and provided with openings through which the blades are adapted to project, and operating means mounted on the frame member and connected with the guard member for moving the same inwardly toward the frame member to a position between the frame member and the cutting edges of the blades to cause the blades to project through the slots of the guard member to expose the cutting edges of the blades outwardly of the guard for meat scoring or tendering purposes.

20. A meat scoring and tendering device comprising a frame member, a plurality of spaced parallel substantially rectangular blades mounted on the frame member and rigid therewith and provided with cutting portions projecting beyond the frame member at one of the faces thereof, a hinged guard member carried by the frame member and normally extending over and away from the cutting portions of the said blades to form a guard for the same and provided with slots through which the blades project when the guard member is moved inwardly with respect to the frame member, means for automatically moving the guard member outwardly, and operating means connected with the guard member for moving the same inwardly toward the frame member to a position between the latter and the cutting edges of the blades to cause the blades to project through the openings of the guard member for meat scoring and tending purposes with the frame member and the guard positioned inwardly of the cutting edges of the blades during such operations.

LOUIS J. BECKER.